United States Patent
Kimbara et al.

(10) Patent No.: US 7,040,109 B2
(45) Date of Patent: May 9, 2006

(54) FUEL CELL SYSTEM AND METHOD OF STORING HYDROGEN

(75) Inventors: Masahiko Kimbara, Okazaki (JP); Daigoro Mori, Mishima (JP); Takehiro Nito, Toyota (JP); Keiji Toh, Kariya (JP); Hidehito Kubo, Kariya (JP)

(73) Assignees: Toyota Jidosha Kabushiki Kaisha, Toyota (JP); Kabushiki Kaisha Toyota Jidoshokki, Kariya (JP)

( * ) Notice: Subject to any disclaimer, the term of this patent is extended or adjusted under 35 U.S.C. 154(b) by 102 days.

(21) Appl. No.: 10/796,020

(22) Filed: Mar. 10, 2004

(65) Prior Publication Data

US 2004/0247959 A1    Dec. 9, 2004

(30) Foreign Application Priority Data

Mar. 17, 2003    (JP)    ............................. 2003-071357

(51) Int. Cl.
| F25D 23/12 | (2006.01) |
| H01M 8/18 | (2006.01) |
| H01M 8/04 | (2006.01) |

(52) U.S. Cl. .................. 62/259.2; 429/22; 429/26
(58) Field of Classification Search ................ 62/180, 62/228.1, 259.2; 429/20, 22, 24, 25, 26
See application file for complete search history.

(56) References Cited

U.S. PATENT DOCUMENTS

| 6,761,987 B1 * | 7/2004 | Marvin et al. ................. 429/13 |
| 2004/0013921 A1 * | 1/2004 | Okada et al. .................. 429/24 |

FOREIGN PATENT DOCUMENTS

| JP | A-7-108909 | 4/1995 |
| JP | A-2000-88196 | 3/2000 |
| JP | A-2000-128502 | 5/2000 |
| JP | A-2000-323157 | 11/2000 |
| JP | A-2001-239847 | 9/2001 |
| JP | A-2001-250570 | 9/2001 |
| JP | A-2002-50373 | 2/2002 |
| JP | A-2004-14213 | 1/2004 |

* cited by examiner

*Primary Examiner*—Marc Norman
(74) *Attorney, Agent, or Firm*—Oliff & Berridge, PLC

(57) ABSTRACT

In a fuel cell system 10, a refrigerant channel 70 that circulates refrigerant is configured to exchange heat between the refrigerant and each of a fuel cell 30, a hydrogen storage tank 20 having a hydrogen storage alloy, and a radiator 50. The hydrogen storage alloy has a higher absorption temperature at which absorption and release become equilibrium under the predetermined hydrogen pressure than the temperature of the fuel cell 30 in a steady-state operation. The refrigerant after cooling the fuel cell carries the heat generated by hydrogen absorption to the hydrogen storage alloy during storing from the tank 20 and facilitates absorption of hydrogen.

16 Claims, 12 Drawing Sheets

FUEL CELL SYSTEM AND METHOD OF STORING HYDROGEN

BACKGROUND OF THE INVENTION

1. Field of the Invention

The present invention relates to a fuel cell system with a hydrogen storage tank that contains hydrogen storage alloys and a method of storing hydrogen for the fuel cell system.

2. Description of the Related Art

Configurations of hydrogen storage tanks having hydrogen storage alloys are conventionally known as means for storing and supplying of hydrogen for the fuel cells. For example, a configuration consisting of a cooling water channel so that cooling water can circulate through a fuel cell, a hydrogen storage tank, and a heat exchange module is disclosed in JAPANESE PATENT LAYING-OPEN GAZETTE No. 2001-250570. In such a configuration, when electric power is generated by the fuel cell, it is possible to heat the hydrogen storage tank with cooling water that has an elevated temperature due to the heat exchange with the fuel cell and use the heat to remove the hydrogen that is absorbed in the hydrogen storage alloy.

When hydrogen is absorbed into the hydrogen storing metal, however, the hydrogen storage alloy needs to be cooled down in order to facilitate the operation of hydrogen absorption. An additional cooling module is thus necessary to cool down the hydrogen storage alloy at the time of hydrogen absorption.

SUMMARY OF THE INVENTION

The object of the present invention is to solve the conventional problem described above, and to provide a technique of simplifying a system configuration in a system that uses a hydrogen storage alloy that needs to be cooled down at the time of hydrogen storage and heated up at the time of hydrogen removal.

In order to achieve the above-mentioned object, the present invention provides a fuel cell system having a fuel cell. The fuel cell system of the invention includes a hydrogen storage tank that is supplied with hydrogen under a predetermined hydrogen pressure and contains a hydrogen absorbing material that at least includes a hydrogen storage alloy, the hydrogen storage alloy having a temperature at which the predetermined hydrogen pressure becomes an equilibrium pressure being higher than a temperature of the fuel cell in a steady operation, a refrigerant channel that circulates refrigerant between the fuel cell and the hydrogen storage tank, and a heat exchange module that cools down the refrigerant that passed through the fuel cell and/or the hydrogen storage tank.

According to the fuel cell system of the present invention, to cooling down the fuel cell, heating up the hydrogen storage tank at the time of hydrogen removal, and cooling down the hydrogen storage tank at the time of hydrogen storage are executable with the refrigerant that circulates through the refrigerant channel. In other words, it is possible to use the refrigerant for cooling the fuel cell also as the refrigerant for cooling the hydrogen storage alloy at the time of hydrogen storage. It is thus possible to simplify the configuration for heating and cooling the hydrogen storage alloy in the hydrogen storage tank.

In addition, since the hydrogen storage tank includes a hydrogen storage alloy that has a temperature at which the pressure of hydrogen to be supplied becomes an equilibrium pressure being higher than that of the fuel cell in the steady operation, it is possible to carry out the operation of hydrogen absorption immediately after the generation of electric power is terminated by the fuel cell. In other words, even if the temperature of the refrigerant that was used for cooling the fuel cell is elevated to approximately the temperature of the fuel cell in the steady operation, it is still possible to use the refrigerant with the elevated temperature to cool down the hydrogen storage alloy and thereby facilitate the operation of hydrogen absorption.

The predetermined pressure, under which hydrogen is supplied to the hydrogen storage tank, is set according to the type of the hydrogen storage alloy such that the temperature of the hydrogen storage alloy at which the predetermined pressure becomes an equilibrium pressure may be higher than that of the fuel cell in the steady operation. The predetermined pressure, however, may be more desirable if it is higher. For example, the pressure of hydrogen to be supplied to the hydrogen storage tank can be set to 1 MPa or higher, preferably to 25 MPa or higher, or more preferably to 35 MPa or higher. Supplying the hydrogen of a higher pressure to the hydrogen storage tank as above allows for the use of a space around the hydrogen absorbing material in the hydrogen storage tank and thus the storage of a greater amount of high pressure hydrogen gas. Furthermore, a degree of flexibility can also be increased in selecting the type of the hydrogen storage alloy for carrying out the present invention.

It should be noted that the steady operation of the fuel cell represents a state in which the internal temperature of the fuel cell is sufficiently elevated after the fuel cell is activated and a warm-up operation is terminated. The fuel cell in the warm-up operation has its voltage to current characteristic varying along with an elevation in the internal temperature, which leads to an improvement of its cell performance, and when the internal temperature reaches a predetermined level, the fuel cell exhibits a desired voltage to current characteristic and starts operating in the steady operation in which electric power is generated with a predetermined voltage according to the load of the fuel cell. The internal temperature of the fuel cell in the steady operation is set in advance, and the fuel cell is cooled down in a way to maintain the fuel cell at such a temperature. In case where the internal temperature of the fuel cell in the steady operation is defined as a predetermined range of temperature, the term "the temperature of the refrigerant that is discharged from the fuel cell in the steady operation" represents a temperature of the refrigerant that is discharged from the fuel cell at the time the fuel cell has the highest temperature in the range of temperature.

Further, the temperature at which the predetermined hydrogen pressure becomes an equilibrium pressure may be an equilibrium temperature at which hydrogen absorption and hydrogen release of the hydrogen storage alloy come equilibrium in hydrogen being supplied with the predetermined hydrogen pressure.

In the fuel cell system of the present invention, wherein the refrigerant channel or a part of the refrigerant channel may also be preferably configured to circulate the refrigerant through the fuel cell, the hydrogen storage tank, and the heat exchange module in this order.

In such a configuration, it is possible to carry out the operation of hydrogen absorption at the same time as the generation of electric power by the fuel cell. In other words, it is possible to use the refrigerant that was used for cooling the fuel cell in the electric power generation also for cooling the hydrogen storage alloy and thereby facilitate the operation of hydrogen absorption.

The fuel cell system of the present invention may further include a refrigerant temperature adjustment module that adjusts a temperature of the refrigerant such that the refrigerant that is discharged from the heat exchange module has an approximately constant temperature regardless of an amount of electric power generation by the fuel cell and also regardless whether the hydrogen storage tank is in a state of hydrogen storing or hydrogen releasing.

In such a configuration, it is possible to start the generation of electric power by the fuel cell immediately after the hydrogen is stored into the hydrogen storage tank. In other words, since the temperature of the refrigerant is already at the level of the temperature of the fuel cell in the steady operation at the time the operation of hydrogen storage is terminated, it is possible to put such refrigerant through the fuel cell and start the electric power generation in the fuel cell without going through the warm-up operation. In particular, if the refrigerant is kept on passing through the fuel cell in the operation of hydrogen storage too, it is possible to maintain the temperature of the fuel cell approximately equal to its temperature in the steady operation even at the time the fuel cell has stopped generating electric power. It is thus possible to eliminate the need for the warm-up operation of the fuel cell.

In the fuel cell system of the present invention, the refrigerant temperature adjustment module may also include a refrigerant flow rate adjustment module that adjusts the flow rate of the refrigerant flowing through the refrigerant channel. In this way, the temperature of the refrigerant that is discharged from the heat exchange module can be maintained at an approximately constant level, only with a simple operation of adjusting the flow rate of the refrigerant.

Additionally, in the fuel cell system of the present invention, the heat exchange module may be provided with a fan for cooling the refrigerant; and the refrigerant temperature adjustment module may include the fan.

In such a configuration, it is possible to improve the cooling efficiency of the hydrogen storage alloy at the time hydrogen is absorbed into the hydrogen storage alloy and thereby facilitate the operation of hydrogen absorption.

Alternatively, in the fuel cell system of the present invention, the refrigerant channel may include a first refrigerant channel that introduces the refrigerant such that the refrigerant passes through the hydrogen storage tank after passing through the fuel cell, and a second refrigerant channel that is divergent from the first refrigerant channel and introduces the refrigerant such that the refrigerant passes through the hydrogen storage tank without passing through the fuel cell, and the fuel cell system may further include a flow rate distribution control module that controls a flow rate of the refrigerant that passes through the first refrigerant channel and a flow rate of the refrigerant that passes through the second refrigerant channel.

In such a configuration, it is possible to reduce influence of the flow rate of the refrigerant that cools down the fuel cell and thereby adjust the flow rate of the refrigerant that passes through the hydrogen storage tank, even in case where the generation of electric power in the fuel cell and the operation of hydrogen absorption are carried out simultaneously.

Furthermore, in the fuel cell system of the present invention, the fuel cell may also be preferably configured as a proton-exchange membrane fuel cell.

The proton-exchange membrane fuel cell has a particularly low operating temperature among types of the fuel cell. In this case, the refrigerant that is discharged from the fuel cell in the steady operation may have a lower temperature, so that the degree of flexibility can be increased in selecting the type of hydrogen storage alloy to be provided in the hydrogen storage tank.

It should be noted that the present invention is configurable into various aspects other than those described above, including a mobile object such as a vehicle that is mounted with the fuel cell system, a method of storing hydrogen, and so on.

DETAILED DESCRIPTION OF THE PREFERRED EMBODIMENTS

Preferred embodiments of the present invention are described with reference of the drawings.

Figure 1:
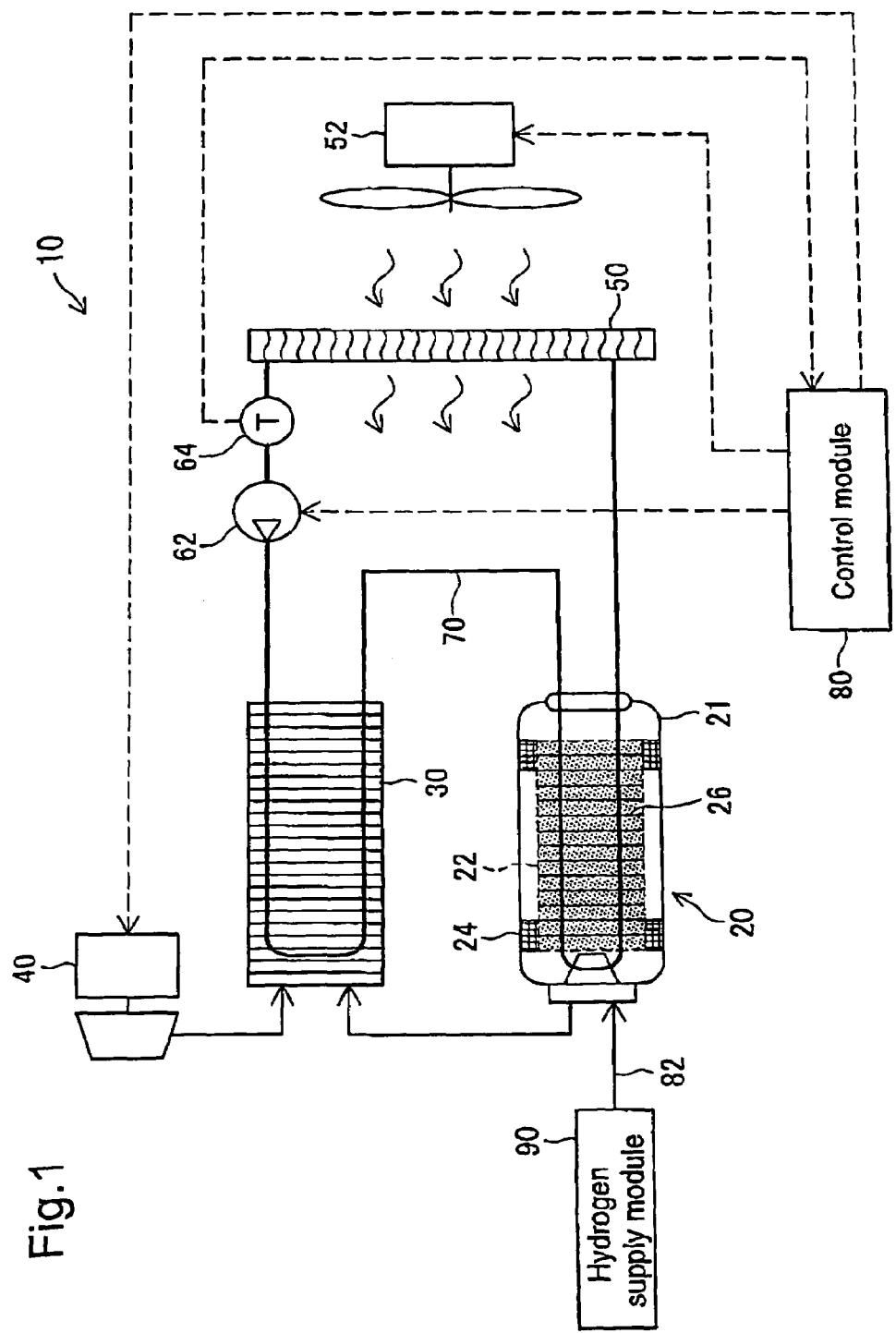
FIG. 1 is a schematic that represents the configuration of a fuel cell system of a first embodiment.

Overall System Configuration:

FIG. 1 is a schematic that represents the general configuration of a fuel cell system 10, which is a first embodiment of the present invention. The fuel cell system 10 includes a hydrogen storage tank 20, a fuel cell 30, a compressor 40, a radiator, a refrigerant channel 70, and a control module 80. In this fuel cell system 10, the hydrogen storage tank 20, the fuel cell 30, and the radiator 50 are connected by the refrigerant channel 70.

The refrigerant channel 70 has its parts in the hydrogen storage tank 20, the fuel cell 30, and the radiator 50, and circulates the refrigerant through these parts. The refrigerant channel 70 is provided with a pump 62 and drives this pump 62 to circulate the refrigerant. In other words, the pump 62 is under the control of the control module 80 and functions as a refrigerant flow rate adjustment module that adjusts a flow rate of the refrigerant flowing through the refrigerant channel 70. Additionally, the refrigerant channel 70 is also provided with a temperature sensor 64 for detecting a temperature of the refrigerant that passed through the radiator 50 and is discharged from the radiator 50. It should be noted, however, that the refrigerant to be used may desirably be a liquid. For example, water is used as the refrigerant in the present embodiment.

The hydrogen storage tank 20 includes: a case 21; an storing alloy enclosure 22 that encloses powdery hydrogen storage alloy therein; and a support 24 that is made of a ring-shaped foamed metal and supports the storing alloy enclosure 22 in the case 21. The hydrogen storage tank 20 also has a part of the refrigerant channel 70 therein, as described previously, such that heat can be exchanged between the refrigerant flowing through the refrigerant channel 70 and the hydrogen storage alloy. Additionally, the storing alloy enclosure 22 has a large number of fins 26 such that the efficiency of heat transfer between the hydrogen storage alloy and the refrigerant channel 70 can be further enhanced.

The fuel cell 30 is a proton-exchange membrane fuel cell that is supplied with hydrogen and oxygen (air) and carries out an electromechanical reaction to obtain an electromotive force. The fuel cell 30 has a stack structure that is formed by laminating a plurality of single cells. The fuel cell 30 has a part of the refrigerant channel 70 formed therein to put the refrigerant pass through, as described previously, so that the heat can be exchanged between the refrigerant flowing through the refrigerant channel 70 and the fuel cell 30. The anode's side of the fuel cell 30 is supplied with hydrogen stored in the hydrogen storage tank 20. The cathode's side of the fuel cell 30 is supplied with compressed air from the compressor 40.

The radiator 50 is a mechanism for lowering the temperature of the refrigerant that is elevated in the course of flowing through the hydrogen storage tank 20 and the fuel cell 30, and has a part of the refrigerant channel 70 formed therein, as described previously. The radiator 50 has a structure that can let outside air through, and is configured as a heat exchange module that exchanges heat between the outside air passing through the radiator 50 and the refrigerant flowing in the refrigerant channel 70. The radiator 50 is also provided with a cooling fan 52 in parallel thereto, in order to draw heat from the refrigerant flowing through the refrigerant channel 70 and cool down the refrigerant aggressively.

The control module 80 is configured as a logic circuit that is mainly composed of a microcomputer and is equipped with a CPU, a ROM, a RAM, or an input/output port for inputting and outputting a variety of signals. The control module 80 inputs detection signals from e.g. the previously-described temperature sensor 64 in the fuel cell system 10 and outputs drive signals to e.g. the previously described compressor 40 or pump 62, thereby controlling the operational status of the entire fuel cell system 10.

External to the fuel cell system 10, a hydrogen supply module 90 is disposed as a mechanism for supplying hydrogen to the hydrogen storage tank 20. The hydrogen supply module 90 and the hydrogen storage tank 20 are connected via a high pressure hydrogen supply channel 82. The pressure of the hydrogen gas to be supplied from the hydrogen supply module 90 is a pressure that has a predetermined relationship with the type of the hydrogen storage alloy in the hydrogen storage tank 20 or with the operating temperature of the fuel cell 30 (or the temperature of the refrigerant that is discharged from the fuel cell in the steady operation), as will be described later. In the light of the type of the hydrogen storage alloy or the operating temperature of the fuel cell 30, the pressure of the hydrogen gas to be supplied from the hydrogen supply module 90 is set to 25 through 70 MPa or preferably to 35 through 70 MPa, for example.

The above-described fuel cell system 10 can be configured into various aspects. For example, the fuel cell system 100 may be mounted onto an electric vehicle and the fuel cell 30 may be used as a power source for driving the vehicle. In this case, a separate high pressure hydrogen supplier may be provided on a predetermined location to function as the hydrogen supply module 90. At the time of hydrogen charge into the hydrogen storage tank 20, a piping that is provided to the high pressure hydrogen supplier as the high pressure hydrogen supply channel 82 may be connected to a hydrogen supply opening that is communicated with the hydrogen storage tank 20 and is open on the surface of the vehicle. The fuel cell system 10 is not only mounted on a mobile object such as a vehicle as a power supply for driving the vehicle, but may also be used as a stationary power supply that supplies electric power to a predetermined facility.

Operation of Hydrogen Storage:

At the time hydrogen is stored into the hydrogen storage tank 20, the pump 62 and the cooling fan 52 are activated to cool down the hydrogen storage tank 20 with the refrigerant in the refrigerant channel 70, while hydrogen is supplied from the hydrogen supply module 90 into the hydrogen storage tank 20.

The amount of hydrogen to be absorbed into the hydrogen storage alloy is determined by the pressure and the temperature of the hydrogen. Generally, a pressure when hydrogen absorption and hydrogen release of the hydrogen storage alloy comes equilibrium under a predetermined temperature is defined as an equilibrium hydrogen pressure, and an equilibrium hydrogen pressure in absorption is defined as an absorption pressure. A temperature when hydrogen absorption and hydrogen release of the hydrogen storage alloy come equilibrium under a predetermined hydrogen pressure is defined as an equilibrium temperature in this specification. The hydrogen storage alloy of each type has a unique equilibrium hydrogen pressure (the pressure of hydrogen at the time the absorption and the release of hydrogen are in balance) that varies according to its temperature. When hydrogen is stored under a predetermined pressure, the hydrogen storage alloy generates heat as it absorbs hydrogen and the temperature of the alloy keeps on rising until the temperature reaches a level at which the gas pressure of the hydrogen supply becomes equal to the equilibrium hydrogen pressure. At the time the temperature of the hydrogen storage alloy reaches the level at which the gas pressure of hydrogen supply becomes equal to the equilibrium hydrogen pressure, it appears that the operation of hydrogen absorption in the hydrogen storage alloy is stopped. Once the temperature of the hydrogen storage alloy reaches the level at which the gas pressure of the hydrogen supply becomes equal to the equilibrium hydrogen pressure, the hydrogen storage alloy becomes capable of further storing an amount of hydrogen that corresponds to a quantity of heat to be removed from the hydrogen storage alloy.

Figure 2:
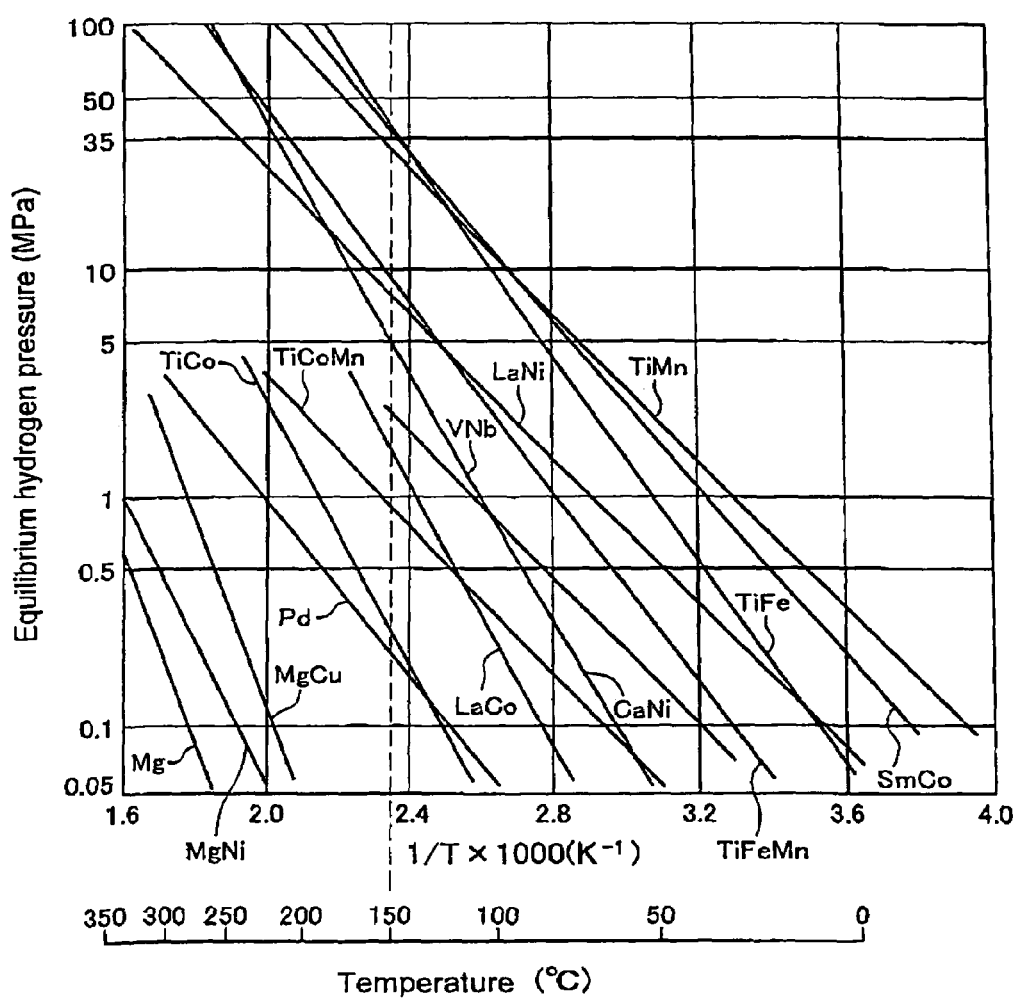
FIG. 2 is a schematic that shows the relationship between equilibrium hydrogen pressure and temperature in various types of hydrogen storage alloys.

FIG. 2 is a schematic that shows the relationship between equilibrium hydrogen pressure and temperature in various types of hydrogen storage alloys. Suppose P represents equilibrium hydrogen pressure and T represents temperature, it is known that $\ln P$ and $1/T$ have a linear relationship for a hydrogen absorption reaction in a hydrogen storage alloy. Accordingly, the equilibrium hydrogen pressure P and the temperature T have the relationships shown in FIG. 2 for the respective hydrogen storage alloys. It should be noted that in FIG. 2, the relationship between the equilibrium hydrogen pressure and the temperature is actually measured only for equilibrium hydrogen pressures up to approximately 5 MPa, and the relationship that is estimated from the linear relationship is shown for equilibrium hydrogen pressures higher than 5 MPa. As shown in FIG. 2, temperatures corresponding to equilibrium hydrogen pressures of 35 MPa or higher are approximately 150° C. or higher for any of the hydrogen storage alloys. Accordingly, in case where such a hydrogen storage alloy is used and hydrogen is absorbed into the hydrogen storage alloy under a gas pressure of 35 MPa or higher, it is possible use the refrigerant of a temperature below 150° C. to facilitate the operation of hydrogen absorption.

It should be noted that in case where a proton-exchange membrane fuel cell is used as the fuel cell, the temperature of the fuel cell in the steady operation is generally set to 70 through 100° C. due to the properties of the solid polymer electrolyte. The steady operation of the fuel cell represents a state in which the internal temperature of the fuel cell reaches a predetermined level after the fuel cell is activated and the warm-up operation is terminated and in which the fuel cell exhibits a desired voltage-to-current characteristic. Since the internal temperature of the fuel cell corresponding to the steady operation is preliminarily set as the range of temperature as described above, the fuel cell is cooled down in a way to maintain the fuel cell within the range of temperature. In the present embodiment, the fuel cell 30 is controlled to have an internal temperature of 80° C. when it is in the steady operation In case where the refrigerant is circulated through the fuel cell 30, the hydrogen storage tank 20, and the radiator 50 as in the present embodiment, the temperature of the refrigerant may sometimes be elevated to nearly the internal temperature of the fuel cell 30 in the steady operation at the time hydrogen is to be stored into the hydrogen storage tank 20. Even in such a case, by supplying hydrogen to the hydrogen storage tank 20 under a gas pressure of 35 MPa or higher, the refrigerant of the elevated temperature can be used to cool down the hydrogen storage tank 20 and the operation of facilitating the hydrogen absorption can be started immediately. Even in case where the gas pressure of the hydrogen supply is even more lower (nearly 25 MPa or nealy 1 MPa, for example), the refrigerant of the elevated temperature can still be used to cool down the hydrogen storage tank 20 depending on the type of the selected hydrogen storage alloy.

In the present embodiment, at the time of hydrogen storage, the pump 62 is driven based on the temperature of the refrigerant that is detected by the temperature sensor 64 such that the refrigerant that is discharged from the radiator 50 may have an approximately constant temperature (may have a predetermined reference temperature). The predetermined reference temperature is set lower than the operating temperature of the fuel cell 30 in the steady operation. As will be described later, the reference temperature is same as the temperature that is used as a basis of the temperature of the refrigerant that is discharged from the radiator 50 at the time the refrigerant is used to cool down the fuel cell 30 in the steady operation. Specifically, the reference temperature is set to 70° C. in the present embodiment.

At the time the refrigerant is cooled down in the radiator 50, the smaller the flow rate of the refrigerant is set by means of the repression of the drive rate of the pump 62, the more sufficiently the refrigerant can be cooled down in the radiator 50, and thus the lower the temperature of the refrigerant that is discharged from the radiator 50 becomes. On the contrary, the larger the flow rate of the refrigerant is set by means of the increase of the drive rate of the pump 62, the higher the temperature of the refrigerant that is discharged from the radiator 50 becomes. In this way, the temperature of the refrigerant that is discharged from the radiator 50 can be controlled by adjusting the flow rate of the refrigerant, and in the present embodiment, the pump 62, which is under the control of the control module 80, is used as a refrigerant flow rate adjustment module for adjusting the temperature of the refrigerant that is discharged from the radiator 50. The drive rate of the pump 62 is adjusted such that the temperature that is detected in the temperature sensor 64 becomes equal to the reference temperature.

Figure 3A:
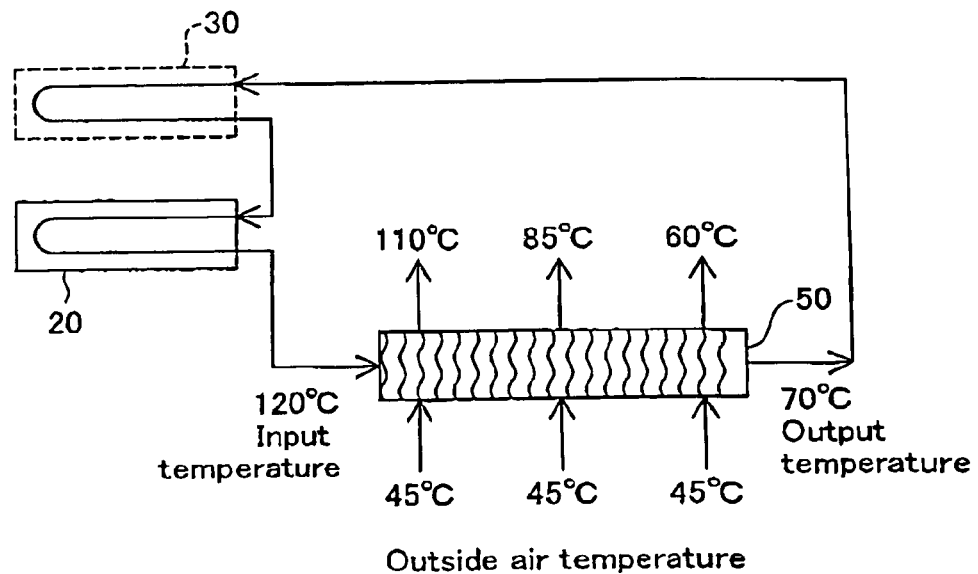
FIG. 3 is a schematic diagram that represents the way the refrigerant that is circulating in a refrigerant channel is cooled down in a radiator.

FIG. 3 is a schematic that represents the way the refrigerant that is circulating in the refrigerant channel 70 is cooled down in the radiator 50; and FIG. 3(A) shows the way hydrogen is stored into the hydrogen storage tank 20. FIG. 4 is a schematic that shows the temperature variations in the refrigerant and the air, where a broken line (A) in FIG. 4 shows the temperature variation in the refrigerant that takes place at the time hydrogen is stored into the hydrogen storage tank 20. For the broken line (A), the so-called heat generating module in FIG. 4 corresponds to the hydrogen storage tank 20 (indicated by solid lines in FIG. 3(A)).

Since heat is developed as hydrogen is absorbed at the time of hydrogen storage, the temperature of the refrigerant that is discharged from the hydrogen storage tank 20 elevates as the hydrogen storage proceeds. FIG. 3(A) and the broken line (A) in FIG. 4 illustrate a case in which the refrigerant that is discharged from the hydrogen storage tank 20 has a temperature of 120° C. The radiator 50 exchanges heat with the air and the pump 62 is driven such that the refrigerant that is discharged from the radiator 50 has a temperature of 70° C. FIG. 3(A) illustrates a case in which the outside air has a temperature of 45° C., as an example. The temperature of the air that passes through the radiator 50 elevates through the exchange of heat in the radiator 50. At this time, the higher the temperature of the refrigerant is, the higher the temperature of the air elevates to. As a result, the more upstream in the flow of the refrigerant the air exchanges heat with, the higher the temperature of the air elevates to, and thus the higher the temperature of the air that is discharged from the radiator 50 becomes, as shown in FIG. 3(A). In FIG. 4, the above described temperature elevations of the air in the radiator 50 are shown as a range of temperature that is surrounded by broken lines (C) and (E). It should be noted, however, that FIG. 3(A) and FIG. 4 only show the temperature elevations of the refrigerant in the hydrogen storage tank 20 and the temperature drops of the refrigerant in the radiator 50, but neglect other processes such as a release of heat in the piping.

In case where the temperature of the refrigerant that is discharged from the radiator 50 is controlled only by the flow rate of the refrigerant, as described above, the amount of heat to be generated along with the hydrogen absorption and the amount of heat to be released from the radiator 50 come into balance at a certain point of time. Under such a circumstance, by releasing the heat at a constant rate from the radiator 50, the amount of hydrogen that is absorbed into the hydrogen storage tank 20 starts increasing at a constant rate that is consistent with the amount of the heat release. In the present embodiment, by providing the cooling fan 52 and aggressively increasing the amount of heat release in the radiator 50, as shown in FIG. 1, it is possible to further increase the rate of the hydrogen absorption while the temperature of the refrigerant that is discharged from the radiator 50 is maintained at a predetermined level.

At the time the operation of storing hydrogen into the hydrogen storage tank 20 is carried out as described above, a predetermined amount of hydrogen is absorbed into the hydrogen storage alloy and high pressure hydrogen gas is charged into a space that surrounds the hydrogen storage alloy within the hydrogen storage tank 20 (hereinafter referred to as "the charge space").

Operation of Hydrogen Release:

It is at the time of electric power generation by the fuel cell 30 that hydrogen is released out of the hydrogen storage tank 20. Accordingly, at the time hydrogen is released out of the hydrogen storage tank 20, the hydrogen storage tank 20 is supplied with the refrigerant that has a temperature corresponding to the temperature of the fuel cell 30 in the steady operation (hereinafter referred to as the steady temperature, approximately 80° C.).

At the time hydrogen is removed out of the hydrogen storage tank 20 that has a sufficient amount of hydrogen stored therein, the high pressure hydrogen that is charged in the previously-mentioned charge space is removed first. The high pressure hydrogen that is removed from the hydrogen storage tank 20 has its pressure lowered sufficiently before being supplied to the fuel cell 30. In this way, at the time hydrogen is removed out of the charge space, the internal temperature of the hydrogen storage tank 20 is maintained at a temperature that is approximately equal to the temperature of refrigerant to be supplied i.e. the steady temperature.

As the high pressure hydrogen is removed from the charge space of the hydrogen storage tank 20, the hydrogen pressure in the charge space drops gradually. Since the temperature of the hydrogen storage tank 20 is approximately equal to the steady temperature, once the hydrogen pressure in the charge space is reached to the equilibrium hydrogen pressure of the steady temperature, the hydrogen storage alloy then starts releasing hydrogen. Since a reaction of the hydrogen release from the hydrogen storage alloy is an endothermic reaction, as hydrogen is released, the temperature of the hydrogen storage alloy drops and thus the equilibrium hydrogen pressure decreases until at last the hydrogen storage alloy stops releasing hydrogen. In the present embodiment, however, the refrigerant of the steady temperature is continuously passing through the hydrogen storage tank 20 and the heat that is generated in the fuel cell 30 is continuously provided to the hydrogen storage alloy, which allows the hydrogen storage alloy to keep on releasing hydrogen.

At the time hydrogen is released as above, the pump 62 controls the flow rate of the refrigerant based on the temperature of the refrigerant that is detected by the temperature sensor 64 such that the refrigerant that is discharged from the radiator 50 may have an approximately constant temperature (may have a temperature that is equal to the previously-mentioned reference temperature for the process of hydrogen storage). In other words, the refrigerant has its temperature dropped to the reference temperature, which is lower than the operating temperature of the fuel cell 30 in the steady operation, in the radiator 50; the refrigerant with the dropped temperature is again introduced to the fuel cell 30 to cool it down; the refrigerant has its temperature elevated to a temperature that corresponds to the operating temperature of the fuel cell 30; the refrigerant with the elevated temperature is supplied to the hydrogen storage tank 20; and the operations are repeated again.

Figure 3B:
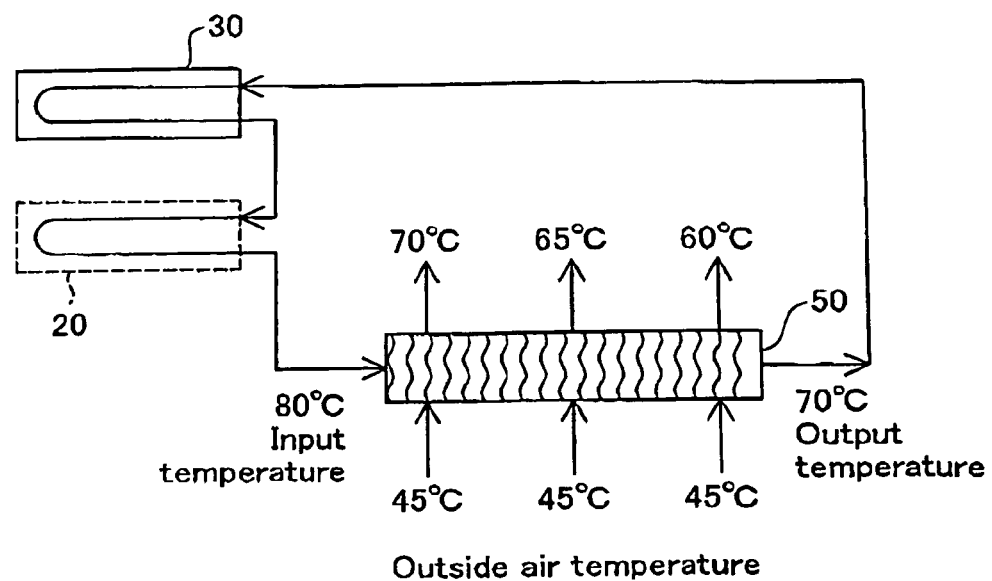
Figure 4:
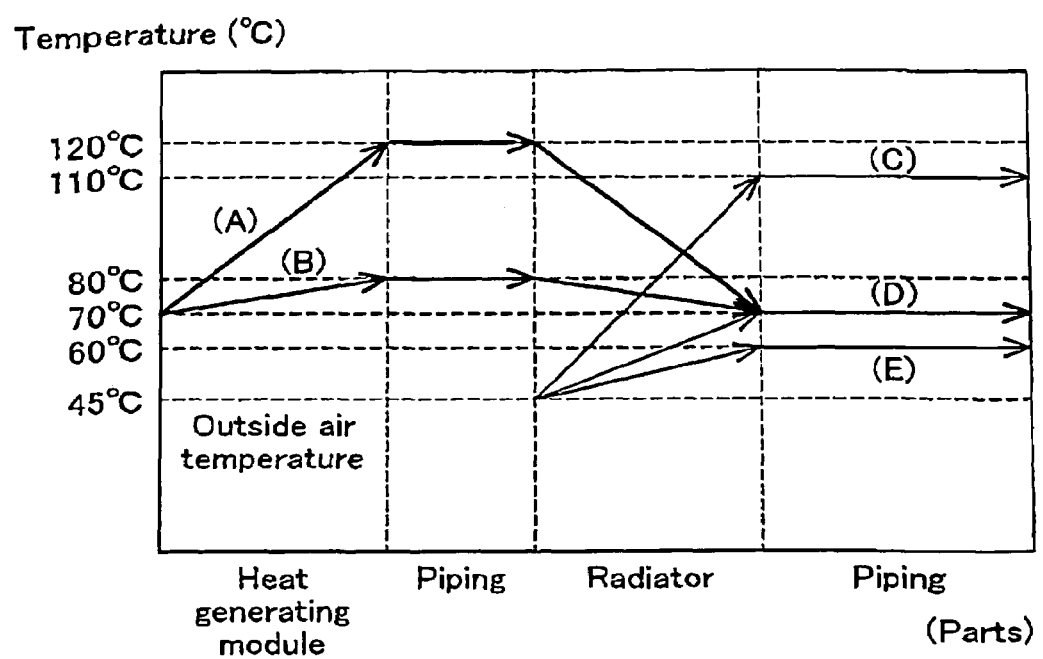
FIG. 4 is a schematic that represents the temperature variations in refrigerant and in air.

FIG. 3(B) illustrates the way hydrogen is removed from the hydrogen storage tank 20; and a broken line (B) in FIG. 4 shows the temperature variations in the refrigerant that take place at the time hydrogen is removed from the hydrogen storage tank 20. For the broken line (B), the so-called heat generating module in FIG. 4 corresponds to the fuel cell 30 (indicated by solid lines in FIG. 3(B)).

At the time hydrogen is removed out of the hydrogen storage tank 20, the refrigerant that is discharged from the fuel cell 30 has the previously described steady temperature, due to the development of heat that occurs along with the generation of electric power by the fuel cell 30. FIG. 3(B) and the broken line (B) in FIG. 4 illustrate a case in which the refrigerant that is discharged from the fuel cell 30 has a temperature of 80° C. The radiator 50 exchanges heat with air and the pump 62 is driven such that the refrigerant that is discharged from the radiator 50 has a temperature of 70° C., which is same as that for the process of hydrogen storage. FIG. 3(B) illustrates a case in which the outside air has a temperature of 45° C., as an example. As shown in FIG. 3(B), the more upstream in the flow of the refrigerant the air exchanges heat with, the higher the temperature of the air elevates to, and thus the higher the temperature of the air that is discharged from the radiator 50 becomes. In FIG. 4, the above described temperature elevations of the air in the radiator 50 are shown as a range of temperature that is surrounded by broken lines (D) and (E). It should be noted, however, that it only shows the temperature elevations of the refrigerant in the fuel cell 30 and the temperature drops of the refrigerant in the radiator 50 herein, but neglects other processes such as the release of heat in the piping. Additionally, since the hydrogen storage alloy absorbs heat as it releases hydrogen, the refrigerant that is supplied to the radiator 50 via the hydrogen storage tank 20 in fact has a temperature slightly lower than 80° C. or the steady temperature.

According to the fuel cell system 10 that is configured as above, the refrigerant for cooling down the fuel cell 30 can be used in both the cooling of the hydrogen storage alloy at the time of hydrogen absorption and the heating of the hydrogen storage alloy at the time of hydrogen removal. In other words, by selecting the type of the hydrogen storage alloy, the pressure at the time of hydrogen supply, and the operating temperature of the fuel cell in combination, such that the temperature of the hydrogen storage alloy, at which the hydrogen pressure for the hydrogen supply becomes equal to the equilibrium hydrogen pressure, may be higher than the temperature of the fuel cell 30 in the steady operation, it is possible to use the refrigerant for cooling the fuel cell 30 also as the refrigerant for cooling the hydrogen storage alloy as well. In this way, it is possible to simplify the configuration for heating and cooling the hydrogen storage alloy.

Additionally, since the temperature of the hydrogen storage alloy at which the pressure of hydrogen that is supplied from the hydrogen supply module 90 becomes equal to the equilibrium hydrogen pressure is higher than the temperature of the fuel cell 30 in the steady operation, it is possible to use the refrigerant with the elevated steady temperature to carry out the operation of hydrogen absorption immediately after the generation of electric power in the fuel cell 30 is terminated. Alternatively, it is also possible to use the refrigerant with the elevated steady temperature to carry out the operation of hydrogen absorption, at the same time as the generation of electric power in the fuel cell 30.

Furthermore, according to the fuel cell system 10 of the present embodiment, since the refrigerant that is discharged from the radiator 50 is controlled to have the same temperature in both the storage of hydrogen and the release of hydrogen (at the time the fuel cell 30 is in operation), it is possible to start the generation of electric power by the fuel cell 30 immediately after hydrogen is stored into the hydrogen storage tank 20. In this way, there is no need for the warm-up operation of the fuel cell 30 at the time the operation of hydrogen storage is just terminated. It should be noted, however, that the refrigerant that is discharged from the radiator 50 not necessarily have exactly the same temperature in both the storage of hydrogen and the release of hydrogen, and it is still possible to obtain similar effects as long as the refrigerant that is discharged from the radiator 50 at the time of hydrogen storage is controlled to have a temperature that is sufficiently close to the steady temperature.

Additionally, even in case where the radiator 50 is used to lower the temperature of the refrigerant for cooling the hydrogen storage tank 20 at the time of hydrogen storage as well as to lower the temperature of the refrigerant for cooling the fuel cell 30, as in the present embodiment, there is still no need for the radiator 50 to grow in size. This is because the cooling efficiency in the radiator 50 at the time of hydrogen storage is higher than that at the time of electric power generation by the fuel cell, although the amount of heat to be released from the hydrogen storage tank 20 at the time of hydrogen storage is generally larger than that to be released from the fuel cell 30 in the steady operation. Suppose the refrigerant that is discharged from the radiator 50 has the same temperature in both of the storage of hydrogen and the release of hydrogen, the refrigerant that is supplied to the radiator 50 at the time of hydrogen storage may have a higher temperature and its difference from the outside air temperature may also be larger. This is why the cooling efficiency in the radiator 50 is enhanced at the time of hydrogen storage.

It is also possible to provide an additional operating mode that further facilitates the charge of hydrogen by accepting the fact that the refrigerant that is discharged from the radiator 50 has a lower temperature at the time of hydrogen charge than at the time of electric power generation by the fuel cell (at the time of hydrogen release) and by driving the pump 62 and the cooling fan 52 such that the refrigerant to be discharged may have a much more lower temperature.

In the present embodiment, it is also possible to store a larger amount of high pressure hydrogen into the charge space by setting the gas pressure of the hydrogen supply at the time of hydrogen storage within the range of 25 MPa through 70 MPa or 35 MPa through 70 MPa, as described previously. It is thus possible to increase the amount of hydrogen that can be stored per unit volume in the hydrogen storage tank 20. Furthermore, in case where the hydrogen supply module 90 supplies hydrogen under a high pressure as described above, it is also possible to use the hydrogen supply module 90 as a hydrogen supplier for charging hydrogen into a high pressure hydrogen container that includes no hydrogen storage alloy and stores hydrogen in the form of high pressure hydrogen.

Figure 5:
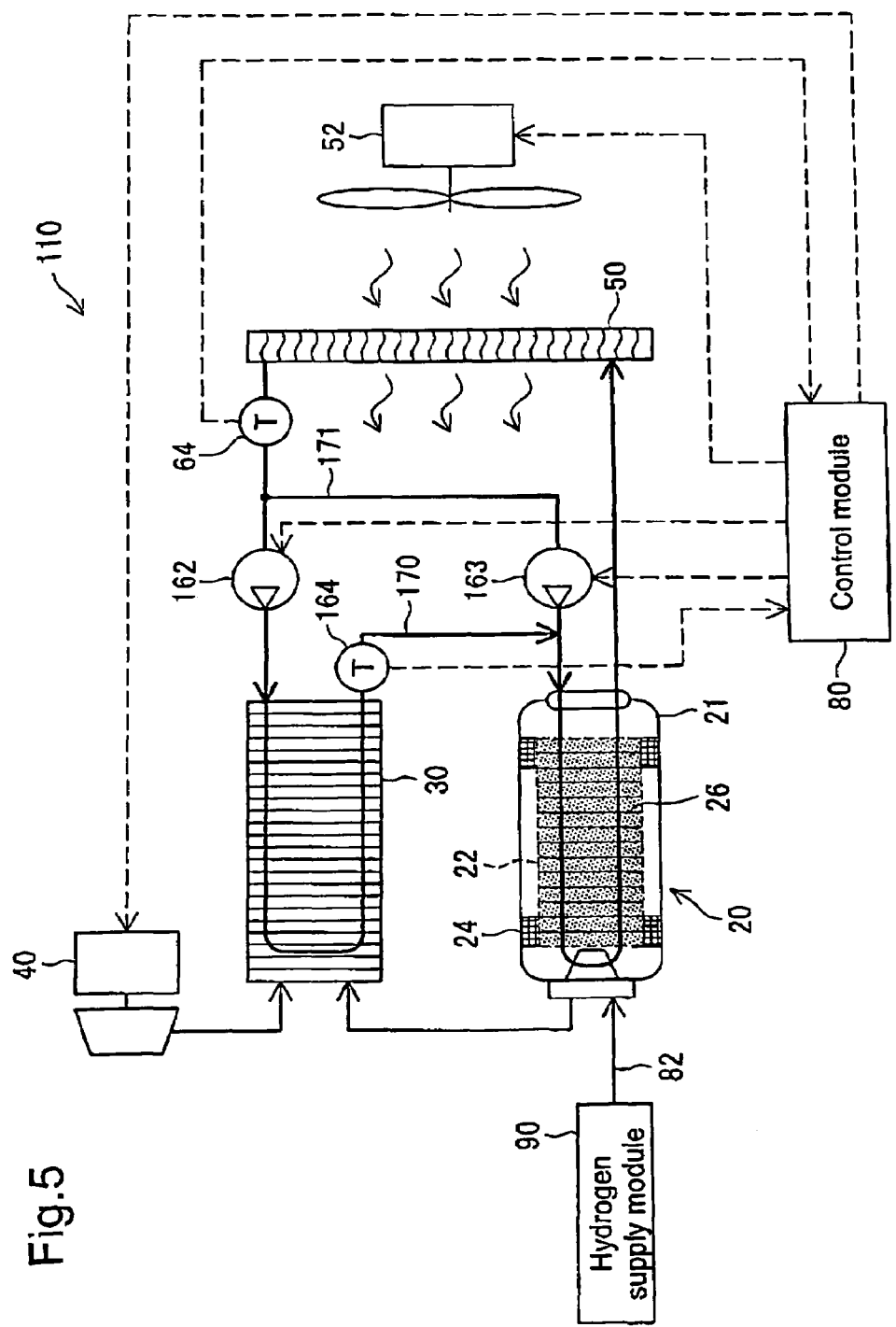
FIG. 5 is a schematic that represents the configuration of a fuel cell system of a second embodiment.

Other Embodiments:

FIG. 5 is a schematic that represents the configuration of a fuel cell system 110 of a second embodiment. In each of the embodiments from the second embodiment and so on, the elements that are in common with the first embodiment are indicated by the same numerals and are not described in detail again.

The fuel cell system 110 includes: a refrigerant channel 170 that is configured similarly as the refrigerant channel 70 in FIG. 1 as a first refrigerant channel; and a refrigerant channel 171 that is disposed divergent from the refrigerant channel 170 and bypasses the fuel cell 30 as a second refrigerant channel. The fuel cell system 110 also includes: a pump 162 for adjusting the flow rate of refrigerant that is circulating through the refrigerant channel 170; and a pump 163 for adjusting the flow rate of refrigerant that is flowing through the refrigerant channel 171. In other words, the pumps 162, 163 that are driven by the control module 80 function as flow rate distribution control modules, each of which controls the flow rate of the refrigerant to be distributed into each of the refrigerant channels 170, 171. The fuel cell system 110 also includes a temperature sensor 164 in the refrigerant channel 170 for detecting the temperature of the refrigerant that is discharged from the fuel cell 30, in addition to the temperature sensor 64.

According to the fuel cell system 110 as described above, the temperature of the refrigerant that is discharged from the radiator 50 can be maintained at a predetermined reference level as in the first embodiment by driving the pump 62 based on detection signals from the temperature sensor 64. It is thus possible to obtain the same effects as those in the first embodiment by attaining such an operation in both the charge of hydrogen and the generation of electric power by the fuel cell 30. It should be noted that at the time of hydrogen charge, the pump 162 may be stopped and only the pump 163 may be used so that the refrigerant may be circulated only between the hydrogen storage tank 20 and the radiator 50.

Furthermore, in case where the charge of hydrogen and the generation of electric power by the fuel cell 30 are carried out simultaneously, the fuel cell system 110 in the present embodiment may be operated in a way that: the pump 162 is driven based on detection signals from the temperature sensor 164 such that the fuel cell 30 may have a temperature corresponding to the steady operation; and the pump 163 is driven based on detection signals from the temperature sensor 64 such that the refrigerant that is discharged from the radiator 50 may have a temperature of the predetermined reference level. By using the two pumps in this way, it is possible to control the flow rate of the refrigerant that passes through the hydrogen storage tank 20 into a more desirable state.

Figure 6:
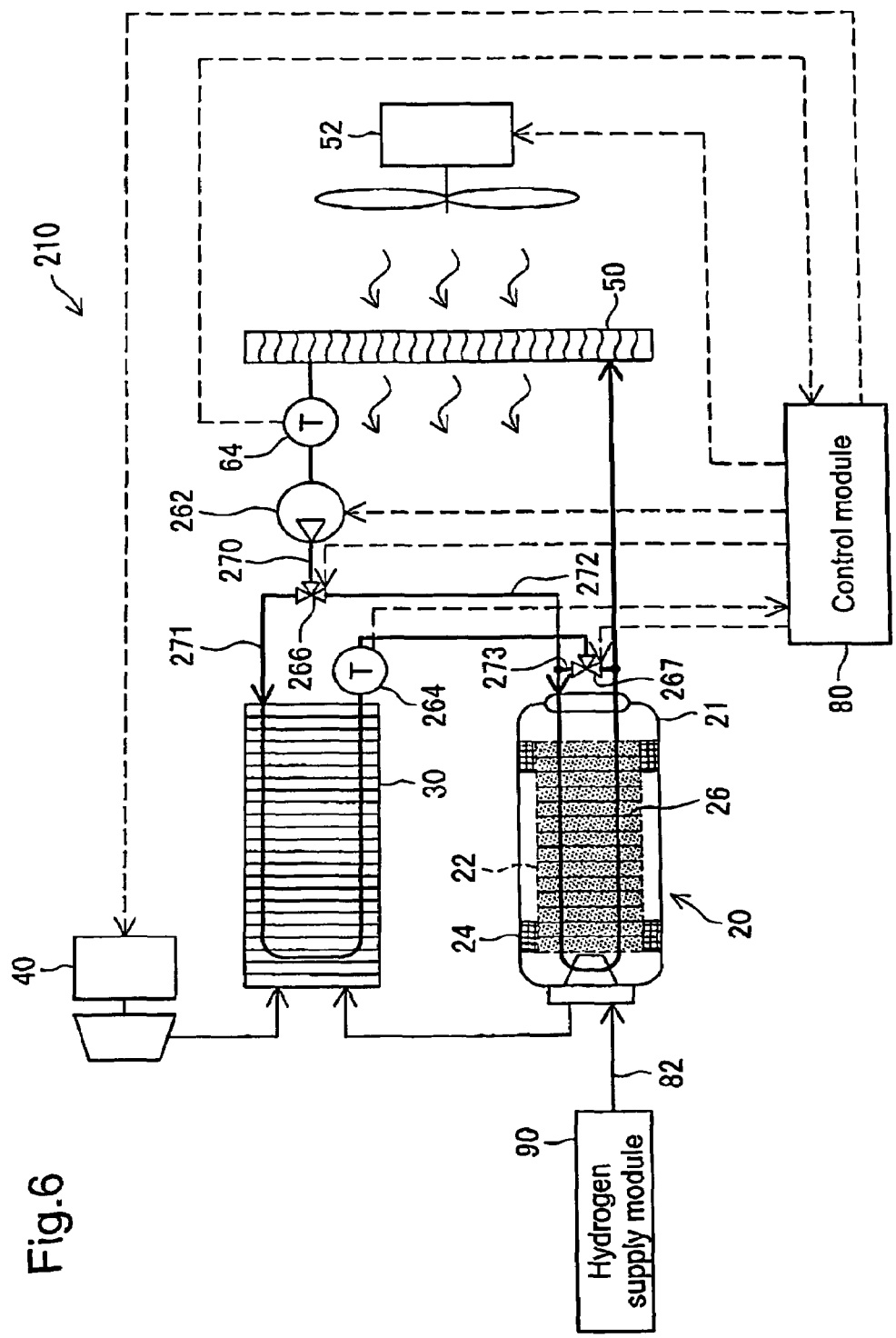
FIG. 6 is a schematic that represents the configuration of a fuel cell system of a third embodiment.

FIG. 6 is a schematic that represents the configuration of a fuel cell system 210 of a third embodiment. The fuel cell system 210 includes: a refrigerant channel 270 into which the refrigerant that is discharged from the radiator 50 flows; and refrigerant channels 271, 272 that are divergent from the refrigerant channel 270. The refrigerant channel 271 is configured to pass through the fuel cell 30. The refrigerant channel 272 is configured to pass through the hydrogen storage tank 20, with its end being connected to the radiator 50. The fuel cell system 210 further includes a refrigerant channel 273 that is disposed divergent from the refrigerant channel 272 and bypasses the hydrogen storage tank 20. The refrigerant channel 273 is connected with an end of the refrigerant channel 271. In this way, the refrigerant that passed through the fuel cell 30 and/or the hydrogen storage tank 20 eventually gathers into the refrigerant channel 272 and is introduced into the radiator 50 via the refrigerant channel 272. The refrigerant channel 270 is provided with a pump 262 that controls the entire flow rate of the refrigerant that flows through the refrigerant channels 270 through 273. The refrigerant channel 271 is also provided with a temperature sensor 264 for detecting the temperature of the refrigerant that is discharged from the fuel cell 30.

At a diverging point where the refrigerant channel 270 diverges to form the refrigerant channels 271, 272, a flow rate adjustment valve 266 is provided to adjust the amount of the refrigerant that flows into each of the refrigerant channels 271, 272. Additionally, at a connection point where the end of the refrigerant channel 271 connects to the refrigerant channel 273, a flow rate adjustment valve 267 is provided to adjust the flow rate of the refrigerant that flows in each direction toward each of the two ends of the refrigerant channels 273. In such a configuration, the refrigerant that flowed into the refrigerant channel 272 via the flow rate adjustment valve 266 may pass through the hydrogen storage tank 20 only. On the contrary, the refrigerant that flowed into the refrigerant channel 271 via the flow rate adjustment valve 266 may pass through the fuel cell 30 and then may be introduced into the radiator 50, with at least a part of the flow passing through the hydrogen storage tank 20 and the remaining part of the flow not passing through the hydrogen storage tank 20 there between, according to the state of the flow rate adjustment valve 267.

In the fuel cell system 210 described above, the flow rate of the refrigerant that passes through the fuel cell 30 and the flow rate of the refrigerant that passes through the hydrogen storage tank 20 are adjusted by the pump 262 and the flow rate adjustment valves 266, 267. The control over the flow rate of the refrigerant is carried out based on detection signals from the temperature sensor 264 such that the fuel cell 30 may have an internal temperature that corresponds to the steady operation and also based on detection signals from the temperature sensor 64 such that the refrigerant that is discharged from the radiator 50 may have a temperature of the previously described reference level.

According to the fuel cell system 210 of the third embodiment, it is possible to attain the similar operations and effects as those in the first embodiment. It should be noted that, at the time of hydrogen charge, the flow rate adjustment valve 266 may be used to prohibit the refrigerant from flowing into the refrigerant channel 271 and cause the refrigerant to circulate only between the hydrogen storage tank 20 and the radiator 50. It should also be noted that, at the time of electric power generation in the fuel cell 30, the flow rate adjustment valve 266 may also be used to prohibit the refrigerant from flowing into the refrigerant channel 272 and cause the refrigerant to circulate only between the fuel cell 30 and the radiator 50. In this case, hydrogen can be removed out of the hydrogen storage tank 20 and supplied for the generation of electric power with no need for the refrigerant to pass through the hydrogen storage tank 20 and cool of the tank 20 aggressively, as long as a sufficient amount of high pressure hydrogen is stored in the charge space in the hydrogen storage tank 20. Furthermore, in case where the charge of hydrogen and the generation of electric power in the fuel cell 30 are carried out simultaneously, it is more possible in the present embodiment than in the first embodiment to reduce the effect of the flow rate of the refrigerant for cooling the fuel cell 30 and adjust the flow rate of the refrigerant for cooling the hydrogen storage tank 20.

Figure 7:
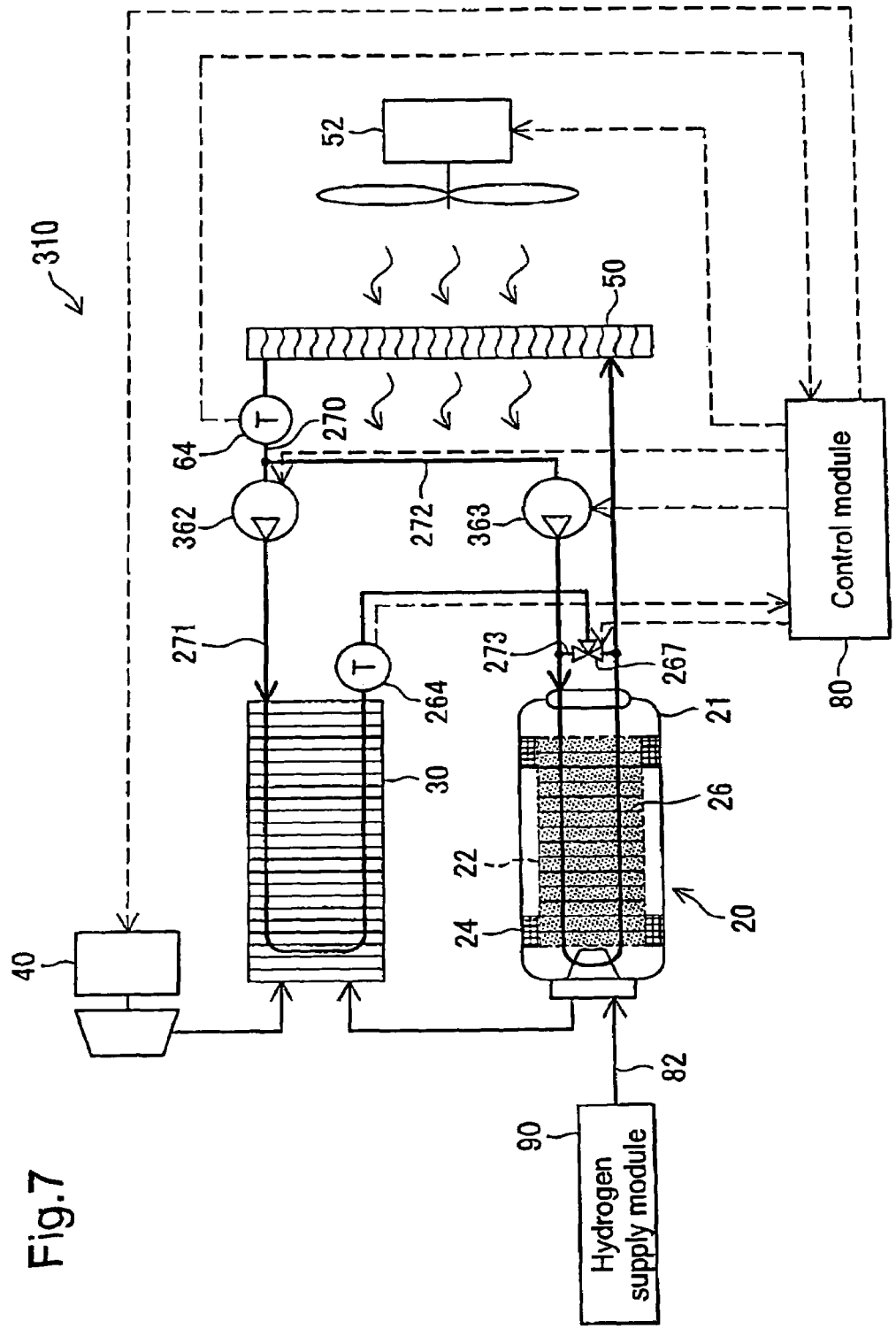
FIG. 7 is a schematic that represents the configuration of a fuel cell system of a fourth embodiment.

FIG. 7 is a schematic that represents the configuration of a fuel cell system 310 of a fourth embodiment. Since the fuel cell system 310 has a similar configuration as the fuel cell system 210 of the third embodiment, the common elements are indicated by the same reference numbers and only the different elements are described in detail. The fuel cell system 310 does not include the pump 262 and the flow rate adjustment valve 266 of the fuel cell system 210, but alternatively includes a pump 362 in the refrigerant channel 271 and a pump 363 in the refrigerant channel 272. The pump 362 controls the flow rate of the refrigerant that is flowing through the refrigerant channel 271; whereas the pump 363 controls the flow rate of the refrigerant that is flowing through the refrigerant channel 272.

According to the fuel cell system 310 of the fourth embodiment, it is possible to attain the similar operations and effects as those in the first embodiment. It should be noted that, at the time of hydrogen charge, the pump 362 may be stopped and only the pump 363 may be used so that the refrigerant may be circulated only between the hydrogen storage tank 20 and the radiator 50. In this case, the pump 362 may be driven based on detection signals from the temperature sensor 264 such that the fuel cell 30 may have an internal temperature that corresponds to the steady operation. It should be noted that at the time of the generation of electric power in the fuel cell 30, the pump 363 may be stopped and only the pump 362 may be used so that the refrigerant may be circulated only between the fuel cell 30 and the radiator 50. In this case, the pump 363 may be driven based on detection signals from the temperature sensor 64 such that the refrigerant that is discharged from the radiator 50 may have a temperature of the previously-described reference level, and at the same time, the flow rate adjustment valve 267 may be driven such that the refrigerant may bypass the hydrogen storage tank 20. Furthermore, in case where the charge of hydrogen and the generation of electric power in the fuel cell 30 are carried out simultaneously in the present embodiment, it is possible to adjust the flow rate of the refrigerant flowing through the fuel cell 30 and the flow rate of the refrigerant flowing through the hydrogen storage tank 20 independently by controlling the pumps 362, 363 and the flow rate adjustment valve 267.

Figure 8:
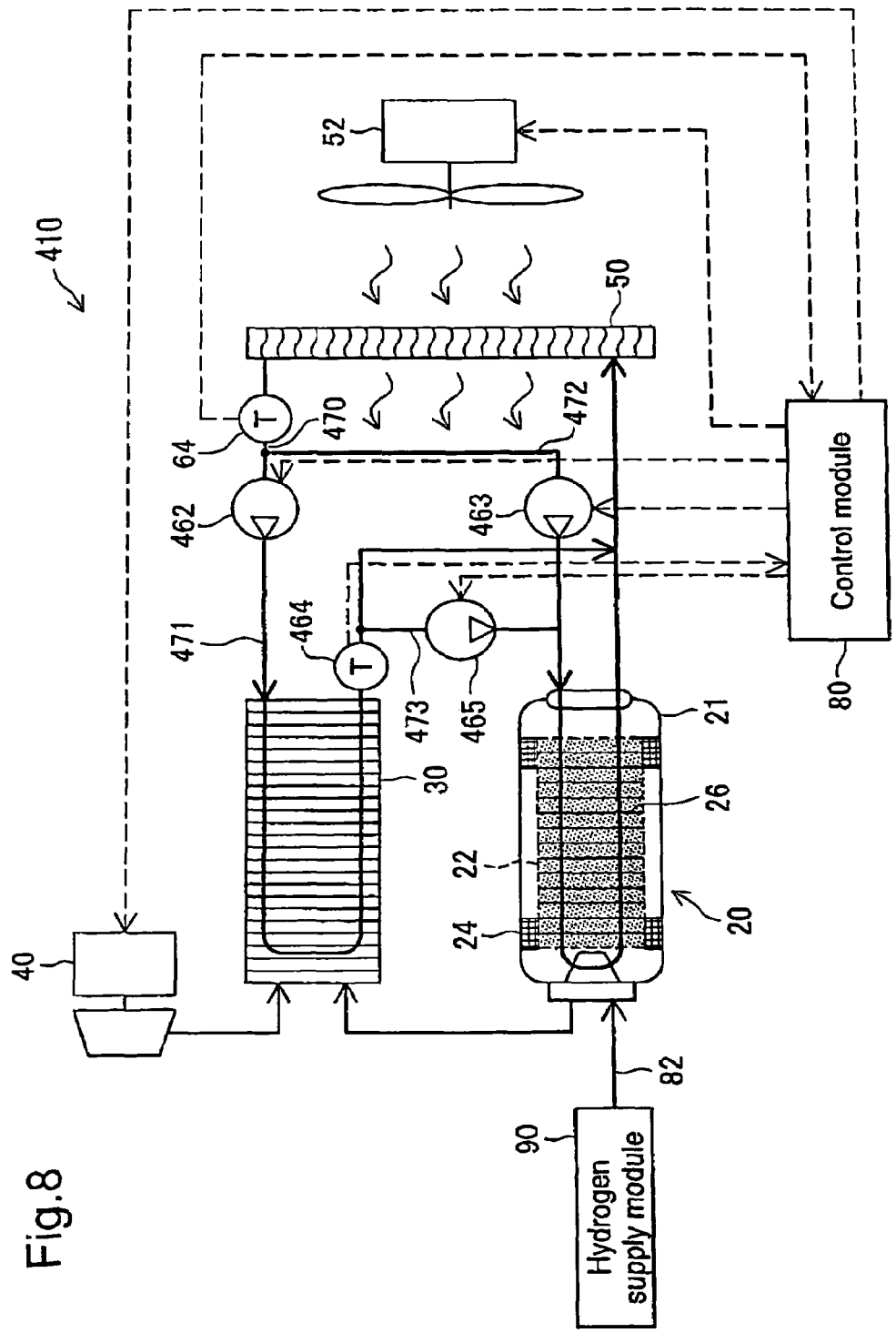
FIG. 8 is a schematic that represents the configuration of a fuel cell system of a fifth embodiment.

FIG. 8 is a schematic that represents the configuration of a fuel cell system 410 of a fifth embodiment. The fuel cell system 410 includes: a refrigerant channel 470 into which the refrigerant that is discharged from the radiator 50 flows; and refrigerant channels 471, 472 that are divergent from the refrigerant channel 470. The refrigerant channel 472 is configured to pass through the hydrogen storage tank 20, with its end being connected to the radiator 50. The refrigerant channel 471 is configured to pass through the fuel cell 30, with its end being connected to a part of the refrigerant channel 472 in which the refrigerant that passed through the hydrogen storage tank 20 flows. The fuel cell system 410 further includes a refrigerant channel 473 that introduces the refrigerant that flowed through the fuel cell 30 via the refrigerant channel 471 to the refrigerant channel 472 in the upstream of the hydrogen storage tank 20. According to such a configuration, the refrigerant that passed through the fuel cell 30 and/or the hydrogen storage tank 20 is eventually introduced into the radiator 50 via the refrigerant channel 472.

The refrigerant channel 471 is provided with a pump 462 for adjusting the flow rate of the refrigerant that passes through the fuel cell 30. The refrigerant channel 472 is provided with a pump 463 for adjusting the flow rate of the refrigerant that flows from the refrigerant channel 470 into the refrigerant channel 472. The refrigerant channel 473 is provided with a pump 465 for adjusting the flow rate of the refrigerant that passes through the refrigerant channel 473 i.e. the flow rate of the refrigerant that passes through both the fuel cell 30 and the hydrogen storage tank 20. The refrigerant channel 471 is also provided with a temperature sensor 464 for detecting the temperature of the refrigerant that is discharged from the fuel cell 30.

According to the fuel cell system 410 of the fifth embodiment, it is possible to attain the similar operations and effects as those in the fourth embodiment in the control over the refrigerant that passes through the fuel cell 30 and the hydrogen storage tank 20.

Figure 9:
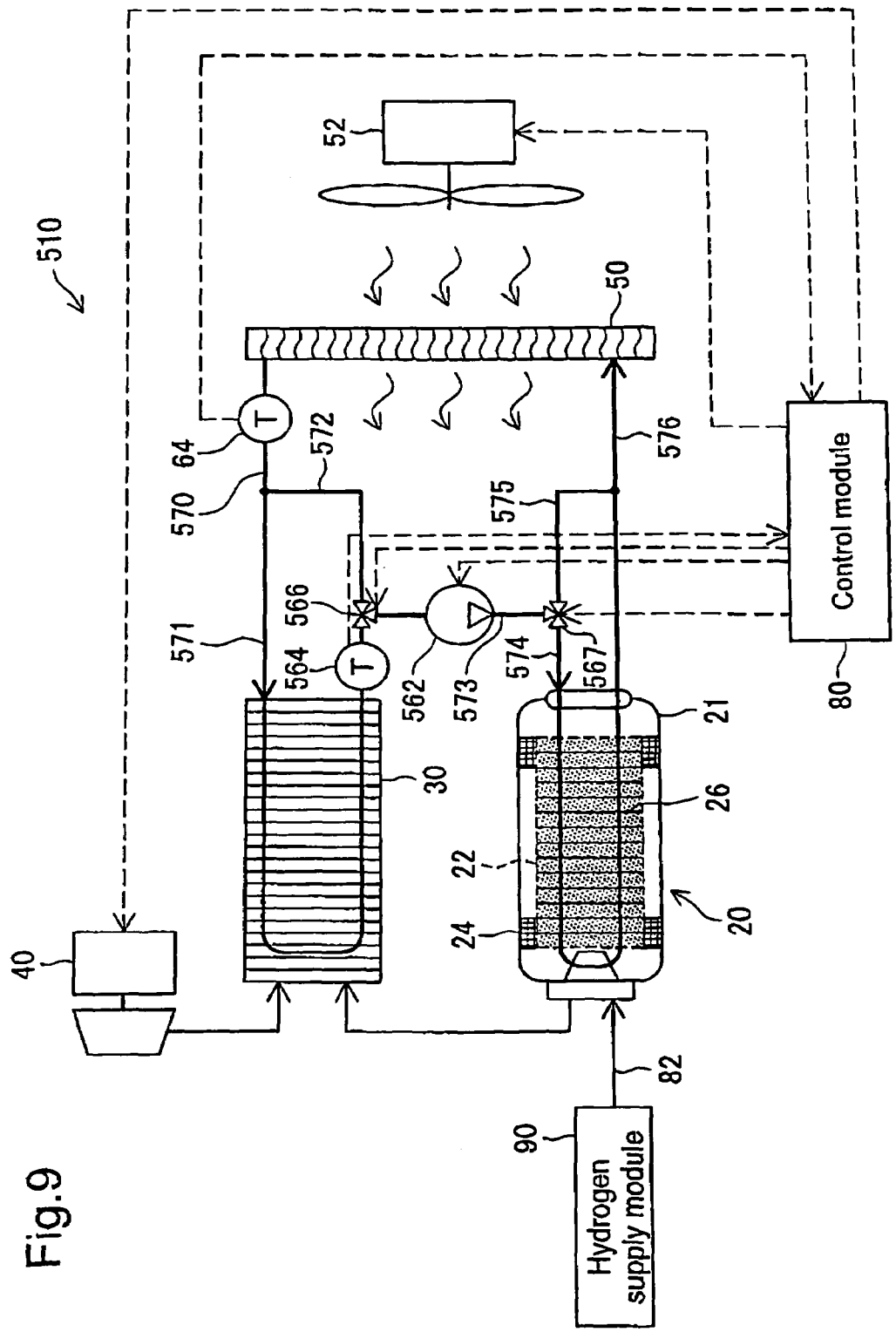
FIG. 9 is a schematic that represents the configuration of a fuel cell system of a sixth embodiment.

FIG. 9 is a schematic that represents the configuration of a fuel cell system 510 of a sixth embodiment. The fuel cell system 510 includes: a refrigerant channel 570 into which the refrigerant that is discharged from the radiator 50 flows; and refrigerant channels 571, 572 that are divergent from the refrigerant channel 570. The refrigerant channel 571 is configured to pass through the fuel cell 30. The refrigerant channel 572 does not pass through the fuel cell 30 but joins the refrigerant channel 571 in the downstream of the fuel cell 30 to form a refrigerant channel 573. The refrigerant channel 573 in its downstream diverges to form refrigerant channels 574, 575. The refrigerant channel 574 is configured to pass through the hydrogen storage tank 20. The refrigerant channel 575 does not pass through the hydrogen storage tank 20 but joins the refrigerant channel 574 in the downstream of the hydrogen storage tank 20 to form a refrigerant channel 576. The refrigerant channel 576 connects to the radiator 50 and introduces the refrigerant into the radiator 50.

A flow rate adjustment valve 566 is provided on a connection point between the refrigerant channels 571, 572 and the refrigerant channel 573. The flow rate adjustment valve 566 can adjust the respective flow rates of the refrigerant that does and does not go through the fuel cell 30 based on the refrigerant that is discharged from the radiator 50. A flow rate adjustment valve 567 is also provided on a connection point between the refrigerant channel 573 and the refrigerant channels 574, 575. The flow rate adjustment valve 567 can adjust the flow rate of the refrigerant that goes through the hydrogen storage tank 20 and the flow rate of the refrigerant that does not go through the hydrogen storage tank 20. Furthermore, the refrigerant channel 573 is provided with a pump 562 for adjusting the flow rate of the entire refrigerant. Additionally, the refrigerant channel 571 is provided with a temperature sensor 564 for detecting the temperature of the refrigerant that is discharged from the fuel cell 30.

According to the fuel cell system 510 of the sixth embodiment, it is possible to attain the similar operations and effects as those in the fourth and the fifth embodiment in the control over the refrigerant that passes through the fuel cell 30 and the hydrogen storage tank 20.

Figure 10:
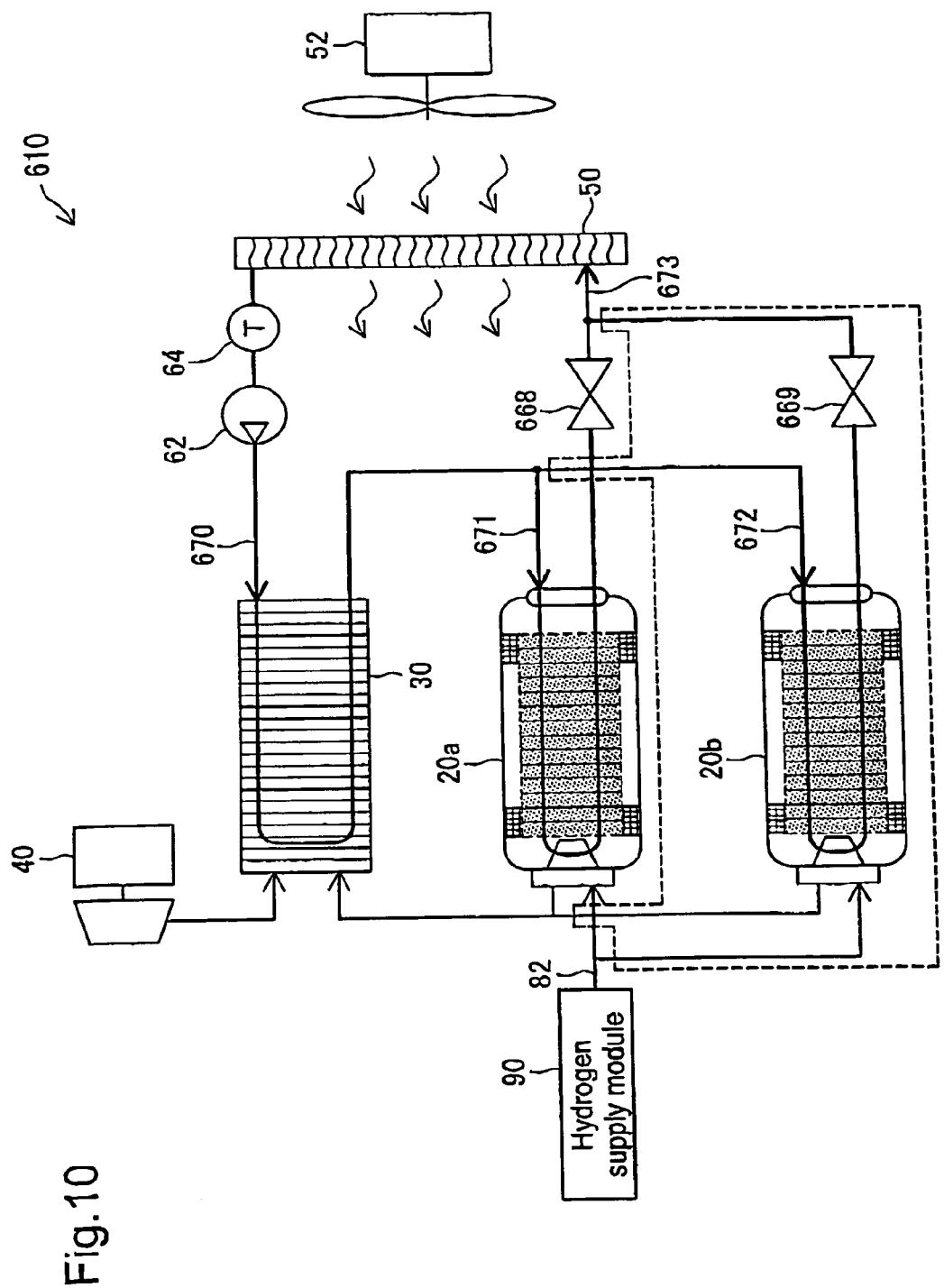
FIG. 10 is a schematic that represents the configuration of a fuel cell system of a seventh embodiment.

FIG. 10 is a schematic that represents the configuration of a fuel cell system 610 of a seventh embodiment. The fuel cell system 610 has a similar configuration as the fuel cell system 10 of the first embodiment, except that is has two hydrogen storage tanks 20a, 20b.

The fuel cell system 610 includes: a refrigerant channel 670 into which the refrigerant that is discharged from the radiator 50 flows; and refrigerant channels 671, 672 that are divergent from the refrigerant channel 670. The refrigerant channel 671 is configured to pass through one hydrogen storage tank 20a; whereas the refrigerant channel 672 is configured to pass through the other hydrogen storage tank 20b. The refrigerant channels 671, 672 meet to form a refrigerant channel 673, which introduces the refrigerant into the radiator 50.

The refrigerant channel 671 is provided with an open/close valve 668, and the refrigerant channel 672 is provided with an open/close valve 669. Opening each of the open/close valves allows the refrigerant to pass through its corresponding hydrogen storage tank 20; whereas closing each of the open/close valves stops the flow of the refrigerant in its corresponding hydrogen storage tank 20. Accordingly, in case where only either one hydrogen storage tanks 20a or 20b is used, it is possible to adjust the open/close valves to stop the flow of the refrigerant in the other hydrogen storage tank 20b or 20a not used.

According to the fuel cell system 610 of the seventh embodiment that is configured as above, it is possible to attain the similar operations and effects as those in the first embodiment in the control over the refrigerant that passes through the fuel cell 30 and the hydrogen storage tank 20, even though two hydrogen storage tanks 20a, 20b are provided.

Figure 11:
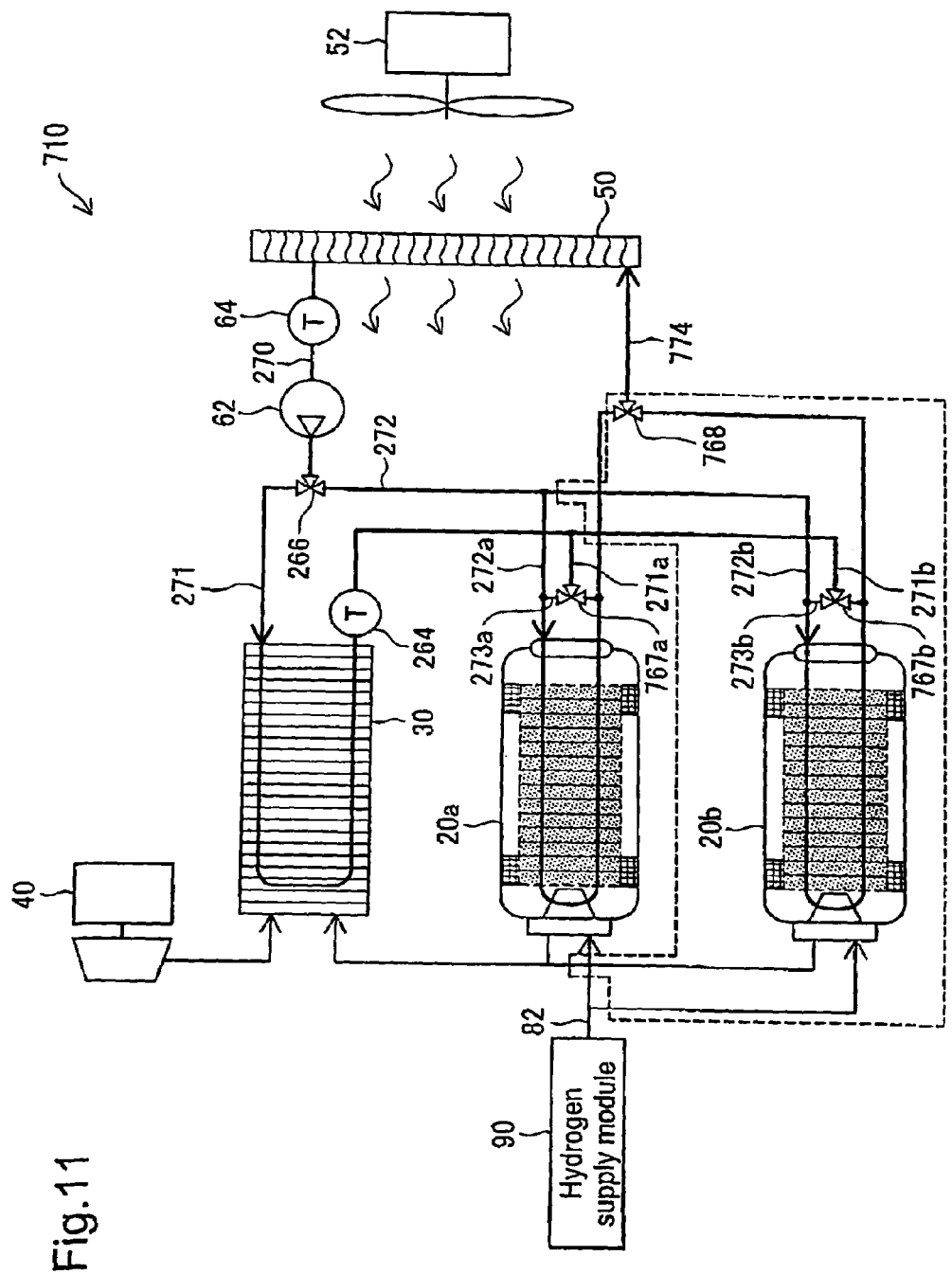
FIG. 11 is a schematic that represents the configuration of a fuel cell system of an eighth embodiment.

FIG. 11 is a schematic that represents the configuration of a fuel cell system 710 of an eighth embodiment. The fuel cell system 710 has a similar configuration as the fuel cell system 210 of the third embodiment, except that is has two hydrogen storage tanks 20a, 20b. In FIG. 11, the elements common with the third embodiment are indicated by the same reference numbers as in the third embodiment. Additionally, the structures that are provided for each of the two hydrogen storage tanks 20a, 20b are indicated by reference numbers that have symbols a, b attached to the reference numbers for the corresponding elements in the third embodiment.

In the fuel cell system 710, the refrigerant channel 272 that is divergent from the refrigerant channel 270 further diverges to form refrigerant channels 272a, 272b. The refrigerant channel 272a is configured to pass through one hydrogen storage tank 20a; whereas the refrigerant channel 272b is configured to pass through the other hydrogen storage tank 20b. The fuel cell system 710 further includes refrigerant channels 273a, 273b that are configured to be divergent from the respective refrigerant channels 272a, 272b and to bypass the respective hydrogen storage tanks. The refrigerant channel 271 diverges to form refrigerant channels 271a, 271b in the downstream of the fuel cell 30. The refrigerant channels 271a, 271b connects to the refrigerant channels 273a, 273b, respectively.

The refrigerant channels 272a, 272b meet to form a refrigerant channel 774 in the downstream of the respective hydrogen storage tanks 20a, 20b and thereby connect to the radiator 50. A flow rate adjustment valve 768 is provided on a meeting point where the refrigerant channels 272a, 272b meet to form the refrigerant channel 774. By controlling the flow rate adjustment valve 768 and prohibiting the refrigerant from flowing from either the refrigerant channel 272a or 272b into the refrigerant channel 774, it is possible to stop the flow of refrigerant in the corresponding hydrogen storage tank 20. Accordingly, in case where only either one hydrogen storage tanks 20a or 20b is used, it is possible to adjust the flow rate adjustment valve 768 to stop the flow of the refrigerant in the other hydrogen storage tank 20b or 20a not used.

According to the fuel cell system 710 of the eighth embodiment that is configured as above, it is possible to attain the similar operations and effects as those in the third embodiment in the control over the refrigerant that passes through the fuel cell 30 and the hydrogen storage tank 20, even though two hydrogen storage tanks 20 are provided.

Figure 12:
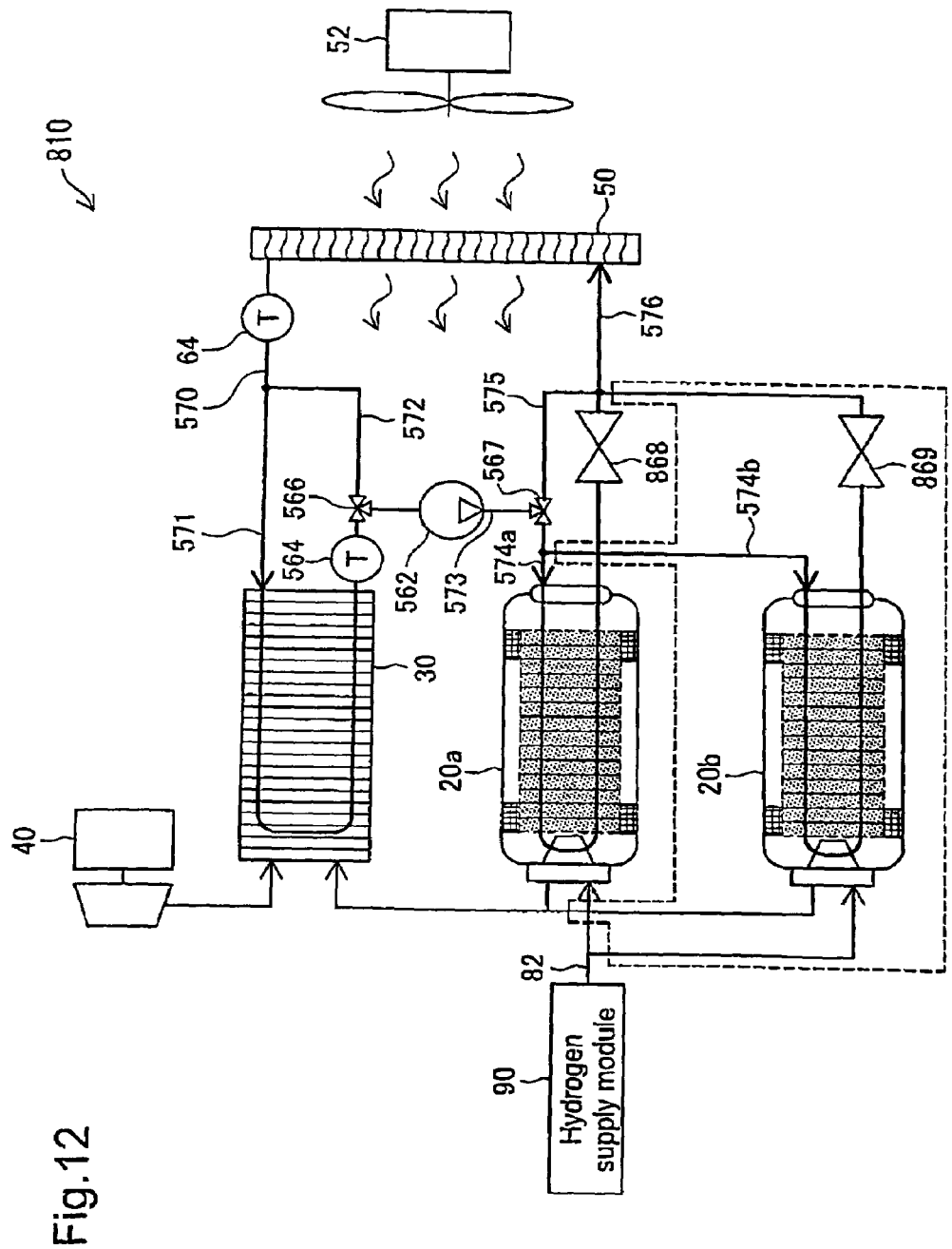
FIG. 12 is a schematic that represents the configuration of a fuel cell system of a ninth embodiment.

FIG. 12 is a schematic that represents the configuration of a fuel cell system 810 of a ninth embodiment. The fuel cell system 810 has a similar configuration as the fuel cell system 510 of the sixth embodiment, except that is has two hydrogen storage tanks 20a, 20b. In FIG. 12, the elements common with the sixth embodiment are indicated by the same reference numbers as in the sixth embodiment. Additionally, the structures that are provided for each of the two hydrogen storage tanks 20a, 20b are indicated by reference numbers that have symbols a, b attached to the reference numbers for the corresponding elements in the sixth embodiment.

In the fuel cell system 810, the refrigerant channel 574 that is divergent from the refrigerant channel 573 further diverges to form refrigerant channels 574a, 574b. The refrigerant channel 574a is configured to pass through one hydrogen storage tank 20a; whereas the refrigerant channel 574b is configured to pass through the other hydrogen storage tank 20b.

The refrigerant channels 574a, 574b join the refrigerant channel 575 to form the refrigerant channel 576 in the downstream of the respective hydrogen storage tanks 20a, 20b and thereby connect to the radiator 50. The refrigerant channel 574a is provided with an open/close valve 868, and the refrigerant channel 574b is provided with an open/close valve 869. Opening each of the open/close valves allows the refrigerant to pass through its corresponding hydrogen storage tank 20; whereas closing each of the open/close valves stops the flow of the refrigerant in its corresponding hydrogen storage tank 20. Accordingly, in case where only either one hydrogen storage tanks 20a or 20b is used, it is possible to adjust the open/close valves 868, 869 to stop the flow of the refrigerant in the other hydrogen storage tank 20b or 20a not used.

According to the fuel cell system 810 of the ninth embodiment that is configured as above, it is possible to attain the similar operations and effects as those in the sixth embodiment in the control over the refrigerant that passes through the fuel cell 30 and the hydrogen storage tank 20, even though a plurality of hydrogen storage tanks 20 are provided.

Although two hydrogen storage tanks 20a, 20b are provided in the seventh to the ninth embodiment for ease of explanation, three or more hydrogen storage tanks may also be provided as well. In this case, the number of the divergent refrigerant channels may be increased according to the number of the hydrogen storage tanks 20 so that the refrigerant can pass through each of the hydrogen storage tank 20, and a valve may also be provided for each of the refrigerant channels as necessary. In other words, the number of the configuration that is surrounded by broken lines in each of FIG. 10 through FIG. 12 may be increased according to the number of the hydrogen storage tanks to be provided.

Modifications:

It should be noted that the present invention is not restricted to the above embodiments or their applications, but may also be implemented in various aspects without departing from the scope or spirit of the main characteristics of the present invention. For example, the following modifications are also possible.

Modification 1:

Although a proton-exchange membrane fuel cell is used as the fuel cell 30 in each of the first through the ninth embodiment, other types of fuel cells may also be used as well. For example, a phosphoric-acid fuel cell or an alkaline electrolyte fuel cell may also be used. Any type of fuel cell is applicable as long as it uses the refrigerant to cool the fuel cell, and all that is required is to select the type of the hydrogen storage alloy in the hydrogen storage tank and to set the pressure of hydrogen that is supplied from the hydrogen supply module according to the operating temperature of the fuel cell to be used. The fuel cell may be configured such that the temperature of the hydrogen storage alloy at which the pressure of hydrogen that is supplied from the hydrogen supply module becomes equal to an equilibrium pressure may be higher than the temperature of the fuel cell in the steady operation.

Since the proton-exchange membrane fuel cell has a particularly low temperature in the steady operation when compared to other fuel cells, the degree of flexibility can be increased in selecting the type of the hydrogen storage alloy. Additionally, in case where a fuel cell with a low operating temperature such as the proton-exchange membrane fuel cell is used, water can be used as the refrigerant.

Modification 2:

Although the hydrogen storage tank in the first through the ninth embodiment described above includes a hydrogen storage alloy as the hydrogen absorbing material for storing and releasing hydrogen, the hydrogen storage tank may also include other material that is capable of absorbing (adsorbing) hydrogen in addition to the hydrogen storage alloy. For example, the hydrogen storage tank may further include activated carbon or carbon nanotube as the hydrogen absorbing material.

What is claimed is:

1. A fuel cell system comprising:
   a fuel cell;
   a hydrogen storage tank that is supplied with hydrogen under a predetermined hydrogen pressure and contains a hydrogen absorbing material that includes at least a hydrogen storage alloy, a temperature of the hydrogen storage alloy at which the predetermined hydrogen pressure becomes an equilibrium pressure being higher than a temperature of said fuel cell during steady operation;
   a refrigerant channel that circulates refrigerant between said fuel cell and said hydrogen storage tank; and
   a heat exchange module that cools down refrigerant that has passed through said fuel cell and/or said hydrogen storage tank.

2. A fuel cell system according to claim 1, wherein said refrigerant channel or a part of said refrigerant channel circulates refrigerant through said fuel cell, said hydrogen storage tank, and said heat exchange module in that order.

3. A fuel cell system according to claim 2, wherein said fuel cell comprises a proton-exchange membrane fuel cell.

4. A fuel cell system according to claim 1, wherein the temperature at which the predetermined hydrogen pressure becomes an equilibrium pressure is an equilibrium temperature at which hydrogen absorption and hydrogen release of the hydrogen storage alloy reach equilibrium with hydrogen being supplied at the predetermined hydrogen pressure.

5. A fuel cell system according to claim 4, wherein said fuel cell comprises a proton-exchange membrane fuel cell.

6. A fuel cell system according to claim 1, further comprising:
   a refrigerant temperature adjustment module that adjusts a temperature of the refrigerant such that refrigerant discharged from said heat exchange module has an approximately constant temperature regardless of an amount of electric power generation in said fuel cell and regardless of whether said hydrogen storage tank is in a state of hydrogen storing or hydrogen releasing.

7. A fuel cell system according to claim 6, wherein said refrigerant temperature adjustment module includes a refrigerant flow rate adjustment module that adjusts a flow rate of refrigerant that flows through said refrigerant channel.

8. A fuel cell system according to claim 7, wherein said heat exchange module has a fan for cooling the refrigerant, and said refrigerant temperature adjustment module includes said fan.

9. A fuel cell system according to claim 4, wherein said fuel cell comprises a proton-exchange membrane fuel cell.

10. A fuel cell system according to claim 7, wherein said fuel cell comprises a proton-exchange membrane fuel cell.

11. A fuel cell system according to claim 6, wherein said fuel cell comprises a proton-exchange membrane fuel cell.

12. A fuel cell system according to claim 1, wherein said refrigerant channel includes:
- a first refrigerant channel that introduces refrigerant such that the refrigerant passes through said hydrogen storage tank after passing through said fuel cell; and
- a second refrigerant channel that is divergent from said first refrigerant channel and introduces refrigerant such that the refrigerant passes through said hydrogen storage tank without passing through said fuel cell,
- wherein said fuel cell system further comprises a flow rate distribution control module that controls a flow rate of refrigerant that passes through said first refrigerant channel and a flow rate of refrigerant that passes through said second refrigerant channel.

13. A fuel cell system according to claim 12, wherein said fuel cell comprises a proton-exchange membrane fuel cell.

14. A fuel cell system according to claim 1, wherein said fuel cell comprises a proton-exchange membrane fuel cell.

15. A method of storing hydrogen in a hydrogen storage tank having a hydrogen absorbing material that contains at least a hydrogen storage alloy, wherein the hydrogen absorbing material absorbs hydrogen to be supplied to a fuel cell, said method comprising:

supplying hydrogen to the hydrogen storage tank under a predetermined hydrogen pressure, wherein the predetermined hydrogen pressure is a pressure at which a temperature of said hydrogen absorbing material when the hydrogen pressure is an equilibrium pressure in the hydrogen storage tank is higher than a temperature of the fuel cell during steady operation;

circulating refrigerant through a refrigerant channel that passes between the fuel cell and the hydrogen storage tank; and cooling refrigerant that has passed through the fuel cell and/or the hydrogen storage tank by means of a heat exchange module that exchanges heat with the refrigerant.

16. A method according to claim 15, wherein the temperature of the hydrogen absorbing material when the hydrogen pressure is the equilibrium pressure is an equilibrium temperature at which hydrogen absorption and hydrogen release by the hydrogen storage alloy reach equilibrium with hydrogen being supplied at the predetermined hydrogen pressure.

* * * * *